(12) United States Patent
Schmidt (10) Patent No.: US 12,003,262 B2
(45) Date of Patent: Jun. 4, 2024

(54) RECEIVER SAMPLING ARCHITECTURE FOR INCREASED DYNAMIC RANGE USING WAVEFORM FEEDBACK

(71) Applicant: Rockwell Collins, Inc., Cedar Rapids, IA (US)

(72) Inventor: Jeffrey D. Schmidt, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 17/976,421

(22) Filed: Oct. 28, 2022

(65) Prior Publication Data
US 2024/0146347 A1 May 2, 2024

(51) Int. Cl.
H04B 1/10 (2006.01)

(52) U.S. Cl.
CPC ................. H04B 1/1027 (2013.01)

(58) Field of Classification Search
CPC ...... H04B 1/16; H04B 1/1027; H04B 1/1036; H04B 2001/1072; H04B 2001/1054; H04B 2001/1045; H04B 1/1081; H04B 1/109; H04B 1/1661; H04B 1/62
See application file for complete search history.

(56) References Cited

U.S. PATENT DOCUMENTS

| | | | |
|---|---|---|---|
| 6,995,553 B1 | 2/2006 | Nygaard, Jr. | |
| 7,362,836 B2 | 4/2008 | Nygaard, Jr. | |
| 7,397,867 B2 | 7/2008 | Moore et al. | |
| 9,276,602 B1* | 3/2016 | Pagnanelli | H03M 1/1038 |
| 9,455,848 B1* | 9/2016 | Zhang | H04L 25/03057 |
| 9,467,317 B2 | 10/2016 | Ray et al. | |
| 10,567,093 B1 | 2/2020 | Buchwald et al. | |
| 2009/0310665 A1* | 12/2009 | Agazzi | H04L 25/03159 |
| | | | 375/229 |

(Continued)

FOREIGN PATENT DOCUMENTS

| | | |
|---|---|---|
| CN | 115225086 A | 10/2022 |
| DE | 602012076378 | 8/2021 |

(Continued)

OTHER PUBLICATIONS

Extended European Search Report dated Apr. 2, 2024; European Application No. 23205845.3.

*Primary Examiner* — Khanh C Tran
(74) *Attorney, Agent, or Firm* — Suiter Swantz IP (57) ABSTRACT

A system and method for selectable sampling of a received RF input spectrum copies the input signal into a set of equivalent input spectra, one for each of a set of parallel sampling paths. The sampled input spectra are converted to a common sampling rate (e.g., baseband I/Q stream) and demodulated into a digital signal for each current time window of a sequence of time windows based on the common rate and corresponding to the receiver output stream. For each current time window, evaluation blocks store the demodulated signals to memory and evaluate the signals for signal quality, distortion, and/or receiver sensitivity based on figures of merit (FOM) determined by the waveform. The highest quality demodulated signal is selected, retrieved from memory, and appended to the digital output stream, providing low distortion demodulated digital output based on the RF input signal in real time or near real time.

14 Claims, 6 Drawing Sheets

(56) References Cited

U.S. PATENT DOCUMENTS

| | | | |
|---|---|---|---|
| 2017/0077945 A1* | 3/2017 | Pagnanelli | .......... H03F 3/45475 |
| 2018/0278408 A1 | 9/2018 | Zhu et al. | |
| 2019/0013828 A1 | 1/2019 | Gouws | |
| 2020/0274561 A1 | 8/2020 | Jakobsson et al. | |

FOREIGN PATENT DOCUMENTS

| EP | 1122891 A1 | 8/2001 |
|---|---|---|
| IL | 256060 A | 1/2018 |

* cited by examiner

414 — Evaluating, via each parallel sampling path and corresponding to a current time window of a sequence of time windows, the current time window associated with the common sampling rate, a signal quality of the demodulated signal according to one or more figures of merit (FOM) associated with the waveform

↓

416 — Selecting, via a path selection circuit in data communication with each parallel sampling channel, at least one demodulated signal corresponding to the current time window based on the evaluating

↓

418 — Appending to a demodulated output stream the at least one selected demodulated signal, the demodulated digital output stream corresponding to the sequence of time windows

420 — Receiving at least one second RF input signal associated with a frequency distinct from the first RF input signal

↓

422 — Producing, via at least one second sampling channel, at least one second demodulated signal based on the at least one second RF input signal

↓

424 — Appending, via the path selection circuit, the second demodulated signal to a second demodulated digital output stream corresponding to the second sampling channel

426 — Receiving, via a coherent combiner, two or more baseband modulated I/Q streams from the N parallel sampling paths

↓

428 — Producing a combined digital signal via coherent combination of the two or more baseband modulated I/Q streams

*FIG. 4D*

RECEIVER SAMPLING ARCHITECTURE FOR INCREASED DYNAMIC RANGE USING WAVEFORM FEEDBACK

BACKGROUND

Broadly speaking, receivers protect small on-channel/desired signals from spurious and other distortion caused by large off-channel/undesired interferers through RF (radio frequency) filtering, RF frequency translation, IF (intermediate frequency) filtering and/or DSP (digital signal processing) filtering. Optimization of these key filtering and frequency translation receiver components while adding capability leads to large and expensive receiver solutions. New receiver solutions that reduce the cost and size of RF filtering, IF filtering, and frequency translation are necessary for achieving legacy levels of receiver performance (sensitivity, dynamic range, etc.) while also adding new capabilities (improved dynamic range, improved sensitivity, increased number of usable frequency channels) are required. Novel sampling system (analog-to-digital converter(s), digital mixer(s), decimation block(s), digital filter(s), digital gain control block(s), digital resampling block(s), demodulation block(s), and other digital signal processing functions) implementations can reduce the complexity of or eliminate the need for RF filtering, IF filtering, and RF frequency translation by moving large and expensive RF/analog functions into a mixed-signal implementation. For example, a sampling system implementation with significant reduction or elimination of on-channel/undesired spurious components that arise due to intermodulation within the sampling system (typically, but not limited to, intermodulation between a large off-channel/undesired signal and the sample clock) can achieve these mixed signal design ambitions.

SUMMARY

In a first aspect, a receiver sampling system for an RF signal receiver is disclosed. In embodiments, the receiver sampling system receives an RF input signal of a particular waveform and duplicates the input signal into a set of copies, e.g., a set of equivalent input spectra, one input spectrum for each of a set of parallel sampling paths. Each sampling channel samples the input spectrum at a distinct initial sampling rate; the resulting samples are resampled and rate-converted to baseband modulated I/Q streams at a common sampling rate shared by all channels, each baseband modulated I/Q stream corresponding to a current time window based on the common rate. Each baseband modulated I/Q stream is demodulated and the set of demodulated signals stored to memory in their respective sampling paths. An evaluation block in each sampling channel assesses the corresponding demodulated signal for signal quality, distortion, and/or receiver sensitivity according to the waveform determined figures of merit (FOM). A path selector circuit selects a demodulated signal from the set and appends the selected signal to the demodulated digital output stream serving as the output of the signal receiver, such that the path selector circuit constructs the output stream in real time or near real time based on the best available demodulated signal for each successive time window.

In some embodiments, the path selector chooses the demodulated signal having the highest signal quality based on the applicable FOM for the current waveform.

In some embodiments, the evaluation block evaluates the demodulated signal for signal quality, signal distortion level, and/or receiver sensitivity based on the applicable FOM.

In some embodiments, the path selector retrieves the selected demodulated signal from the appropriate memory in which it was originally stored, and appends the retrieved signal to the demodulated digital output stream for the current time window.

In some embodiments, the dedicated memory in each sampling channel time-aligns the stored demodulated signal to the demodulated digital output stream, e.g., by inserting time markers corresponding to the current time window.

In some embodiments, the receiver system coherently combines two or more baseband modulated I/Q streams into a combined digital signal which is demodulated and evaluated for FOM along with the parallel sampling streams. The combined demodulated signal may be selected and appended to the demodulated digital output stream.

In some embodiments, some parallel sampling paths are dedicated to the reception, sampling, processing, and/or demodulation of additional RF input signals at different frequencies in parallel with primary receiver sampling operations.

In a further aspect, a method for selectable sampling of a received RF input signal is also disclosed. In embodiments, the method includes receiving an RF input signal of a particular waveform. The method includes copying or duplicating the RF input signal into a set of N equivalent copies, or input spectra, each input spectra forwarded to one of N parallel sampling paths (where N is an integer), each sampling channel having a distinct initial sampling rate. The method includes sampling each input spectrum at the initial sampling rates to produce a set of digital input signals, wherein one or more digital input signals may include intermodulation products associated with a particular initial sampling rate. The method includes converting, via resampling, each digital input signal to a baseband modulated I/Q stream associated with a common sampling rate across all sampling paths. The method includes demodulating each baseband modulated I/Q stream into a digital demodulated signal. The method includes storing each demodulated signal to dedicated memory in each sampling channel. The method includes evaluating, for a current time window defined by the common sampling rate, aspects of each demodulated signal according to figures of merit (FOM) defined by the waveform. The method includes selecting, via a path selection circuit, a demodulated signal for the current time window based on the signal evaluations in each parallel sampling path. The method includes appending the selected demodulated signal to a demodulated digital output stream for the current time window (e.g., the ultimate digital output of the signal receiver), where the demodulated digital output stream is based on a sequence of time windows.

In some embodiments, the method includes selecting the demodulated signal associated with the highest signal quality.

In some embodiments, the method includes evaluating each demodulated signal on the basis of signal quality, signal distortion, and/or receiver sensitivity.

In some embodiments, the method includes time-aligning each stored demodulated signal to the demodulated digital output stream, e.g., via time markers defining the current time window.

In some embodiments, the method includes retrieving from memory the stored demodulated signal corresponding to a selected demodulated signal, and appending the retrieved demodulated signal to the demodulated digital output stream for the current time window.

In some embodiments, the method includes coherently combining two or more baseband modulated I/Q streams into a combined digital signal (e.g., on the basis of prior or historical high signal quality, low distortion, etc. among the associated sampling paths). The method includes demodulating the combined digital signal and evaluating the combined demodulated signal according to the applicable FOM along other parallel sampling paths, and selecting and appending the combined demodulated signal to the demodulated digital output stream if the combined demodulated signal is of sufficient signal quality.

In some embodiments, the method includes receiving additional RF input signals associated with different frequencies than the primary RF input signal. The method includes dedicating some of the parallel sampling paths to the reception, sampling, processing, and/or demodulating of additional RF input signals simultaneously with primary parallel sampling operations.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a multi-path receiver architecture incorporating parallel sampling to generate particular sets of intermodulation products and/or spurious characteristics, preserving desired characteristics, improving range, and minimizing spurious susceptibility through dynamic selection of the optimal signal path(s) at any given time, building a high quality output signal in real time or near real time from the signal path(s) providing the least distortion or best sensitivity level. For example, the physical size and cost of a signal receiver apparatus may be significantly reduced by reducing the size and complexity of radio frequency (RF) filtering, intermediate frequency (IF) filtering, and/or frequency translation. Further, if increased dynamic range or reduced sensitivity is a lower priority or the RF input includes multiple tunable channels, parallel sampling paths may be leveraged for reception and demodulation of independent tunable channels at multiple frequencies. In some embodiments, the receiver system may combine channels of similarly high signal quality (e.g., lack of on-channel spurs) to improve overall signal-to-noise ratio (SNR; e.g., 3 dB for every octave increase in sampling system paths).

Figure 1:
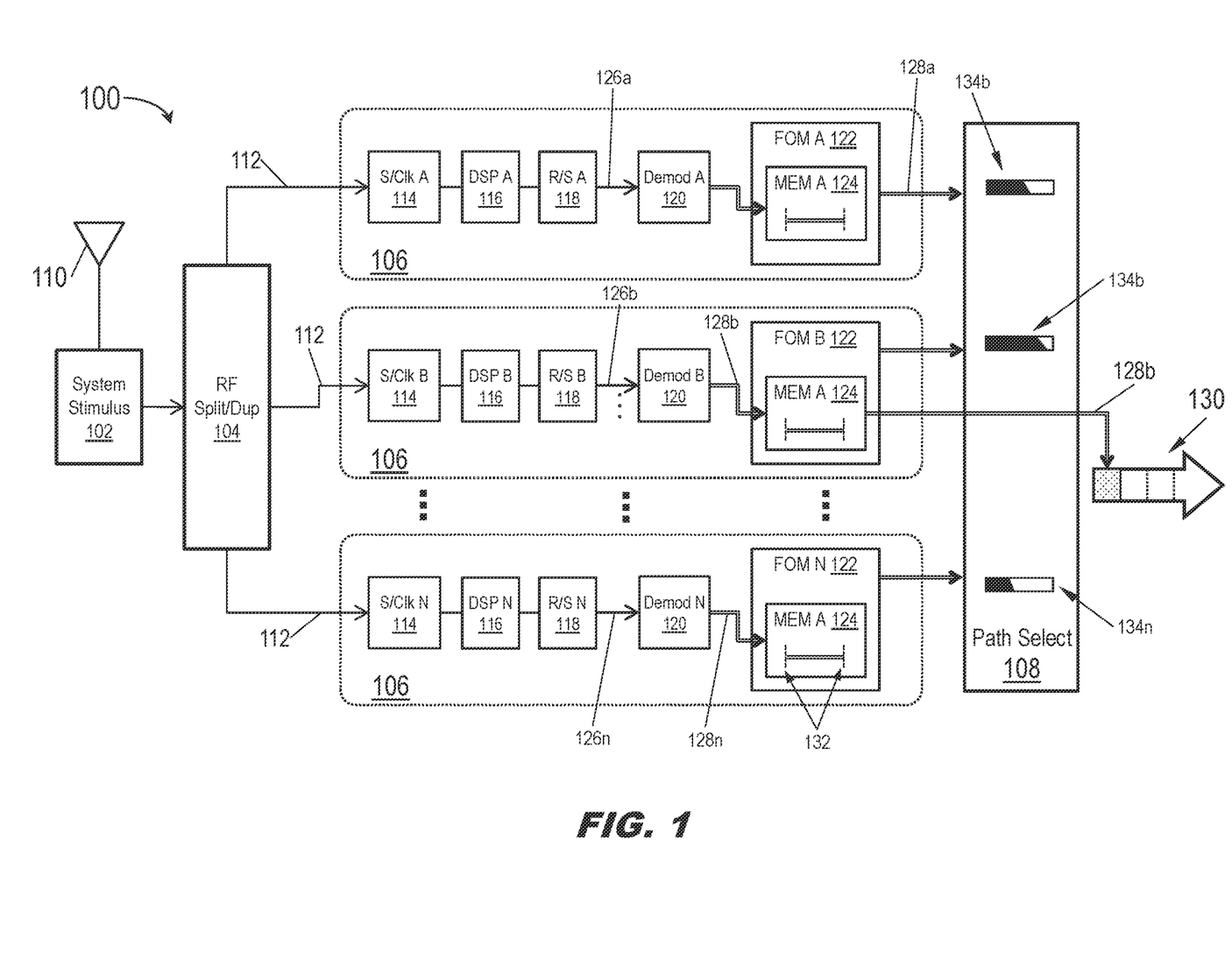
FIG. 1 is a block diagram illustrating a multi-path parallel sampling receiver according to example embodiments of this disclosure.

Referring now to FIG. 1, a signal receiver 100 is shown. The signal receiver 100 may include a system stimulus 102, RF signal splitter/duplicator 104, parallel sampling paths 106 (e.g., sampling paths), and path selector 108.

In embodiments, the system stimulus 102 may include a received analog RF signal of a particular waveform. For example, the system stimulus 102 may be received via a RF antenna 110. In embodiments, the RF signal splitter/duplicator 104 may manipulate and/or split the system stimulus to produce a set of N input spectra 112, where N is an integer (for example, N may be an exponential product $2^m$, where m is also an integer. For example, each input spectrum 112 of the set N input spectra may be substantially equivalent, e.g., a copy of the system stimulus 102.

In embodiments, each parallel sampling path 106 may include a sampler 114, additional digital signal processors 116 (DSP), resampler 118, demodulators 120, and a figure of merit (FOM) evaluation block 122 including a dedicated memory 124. For example, each sampler 114 may include a sampling clock set to an initial sampling rate distinct from the sampling clock of each other sampler/sampling path, e.g., 1.0 GHz, 1.1 GHz, 1.2 GHz, etc. In embodiments, the initial sampling rate of each sampling clock 114 may be chosen to induce specific sets intermodulation products caused by the intermodulation of the sampling clock and the input spectrum 112. Further, the sampling intervals of the respective parallel sampling paths 106 may be partially determined by the waveform of the RF system stimulus 102. Furthermore, each sampler 114 may include a single analog-digital converter (ADC) or a bank of several ADCs outputting an averaged product of the individual ADCs.

In embodiments, each parallel sampling path 106 may include additional digital signal processors 116, e.g., switch banks, digital filters, digital mixers, decimation blocks, cubic interpolators, and/or other DSP components capable of providing additional refinement for the raw samples of the input spectrum 112.

In embodiments, each sampler 114 may sample the input spectrum 112 at its distinct initial sampling rate, and each resampler 118 (e.g., rate converter) may convert the raw samples based on the input spectrum 112 from the initial sampling rate to a common sampling rate shared across all parallel sampling paths 106, producing a common-rate baseband modulated I/Q stream 126a-126n. For example, the common sampling rate may define a time window and accordingly a frequency with which new segments are selected (e.g., a demodulated signal 128a-128n based on each baseband modulated I/Q stream 126a-126n is selected from the set of demodulated signals and appended to a demodulated digital output stream 130, e.g., the ultimate digital output of the signal receiver 100). If, for example, the common sampling rate is 1 GHz, the converted baseband modulated I/Q streams 126a-126n (and, e.g., the selected demodulated signals 128a-128n appended to the demodulated digital output stream 130, as described below) may correspond to segments having a period of 1 ns.

In embodiments, the demodulators 120 of each parallel sampling path 106 may demodulate the baseband modulated I/Q stream 126a-126n based on each sampled/converted input spectrum 112 into a demodulated digital signal 128a-128n. For example, each demodulated digital signal 128a-128n may be received by the FOM evaluation block 122 and stored to the dedicated memory 124 while the demodulated digital signal is evaluated for distortion and/or signal sensitivity. It may be noted that the signal receiver 100 comprises N parallel sampling paths 106 (e.g., parallel sampling channels), each parallel sampling path including a sampler 114 and sampling clock set to a distinct initial sampling rate. Accordingly, the digital products of each of the N samplers 114, e.g., the sampled input spectra 112 and the corresponding baseband modulated I/Q streams 126a-126n and demodulated digital signals 128a-128n, may not be precisely time-aligned regardless of their conversion to the common sampling rate. In embodiments, the dedicated memory 124 of each parallel sampling path 106 may insert time markers 132 into each stored demodulated digital signal 128a-128n in order to time-align the set of demodulated digital signals for seamless insertion into the demodulated digital output stream 130 of the signal receiver 100. For example, time markers 132 inserted by the dedicated memory 124 may be based on the common sampling rate, such that a segment of appropriate length and/or period from the selected demodulated digital signal 128a-128n is appended to the demodulated digital output stream 130 regardless of the initial sampling rate associated with the parallel sampling path 106 from which the demodulated digital signal was selected.

In embodiments, the path selector 108 may evaluate (132a-132n) a set of demodulated digital signals 128a-128n corresponding to each set of stored baseband modulated I/Q streams 126a-126n (and, e.g., corresponding to the current time window) 128a-128n for distortion and/or sensitivity based on specific figures of merit (FOM; e.g., bit error rate (BER), message completion rate (MCR)) determined by the waveform of the RF system stimulus 102. For example, as noted above the sampler 114 of each parallel sampling path 106 may sample the input spectrum 112 at a distinct initial sampling rate according to its sampling clock. Accordingly, each baseband modulated I/Q stream 126a-126n and corresponding demodulated digital signal 128a-128n may be associated, even after sampling, resampling, and/or conversion to the common sampling rate, with a distinct set of intermodulation products caused by intermodulation of the input spectrum 112 and the sampling clock of each sampler 114. Further, on a path-by-path basis selected intermodulation products may constitute on-channel interference capable of degrading the ability of the demodulators 120 to demodulate the baseband modulated I/Q stream 126a-126n, thereby adversely affecting the signal quality of (e.g., distorting) the resulting demodulated digital signals 124a 128a-128n (and by extension, the FOM).

In embodiments, the path selector 108 may retrieve from the appropriate dedicated memory 124 the demodulated signal 128b associated with the highest signal quality and/or receiver sensitivity 132b according to the current FOM (e.g., a lack of on-channel intermodulation products associated with FOM degradation), and append the demodulated digital signal 128b to the demodulated digital output stream 130 (e.g., corresponding to the current time window). For example, by storing segments of the demodulated digital signals 128-128n to dedicated memory 124, the signal receiver 100 may maintain a high quality demodulated digital output stream 130 in real time or near real time and without loss of data while the path selector 108 dynamically determines which demodulated digital signal 128a-128n to add for each successive time window of the sequence of time windows.

Figure 2:
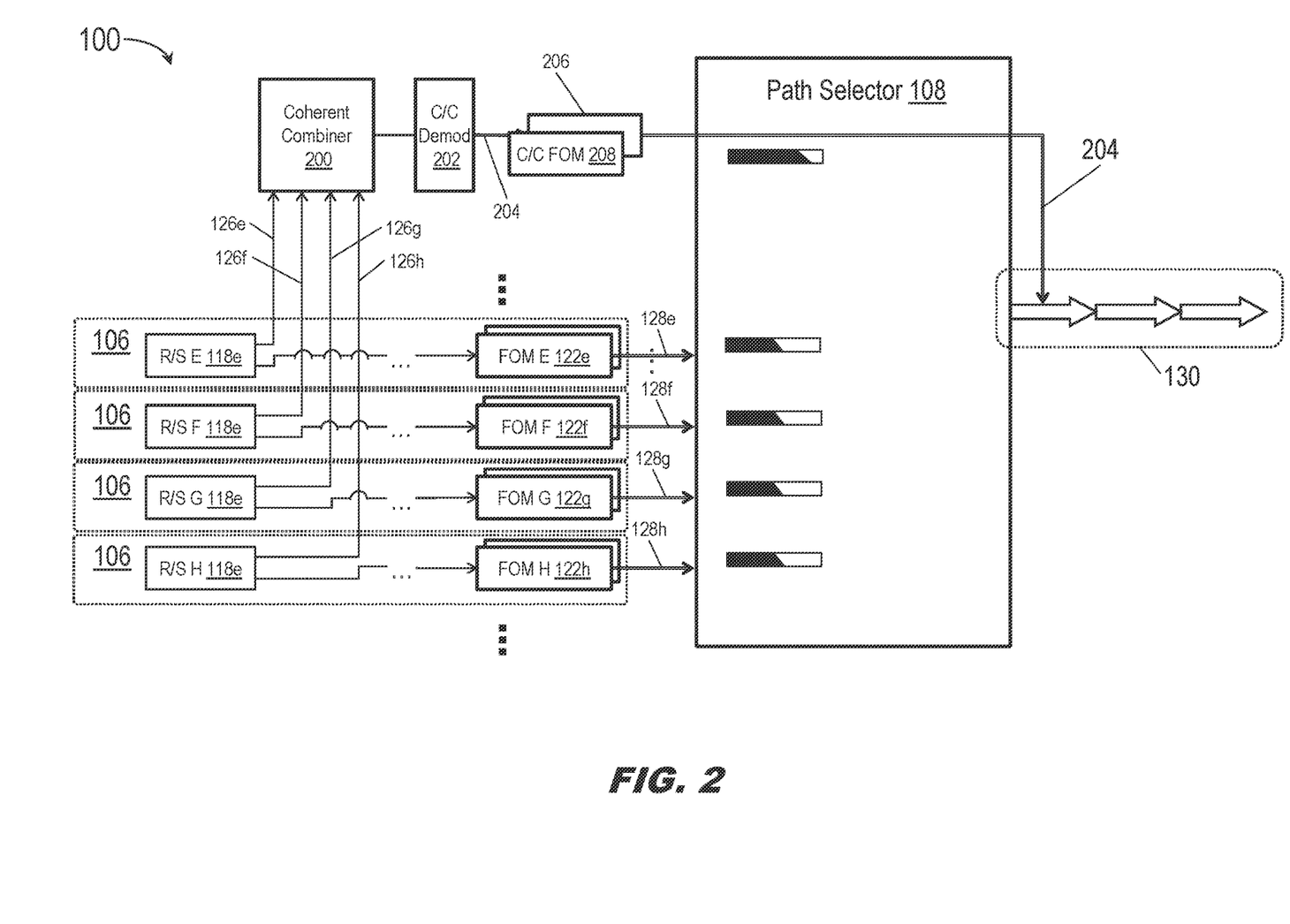
FIG. 2 is a block diagram illustrating parallel sampling operations of the receiver of FIG. 1.

Referring now to FIG. 2, the signal receiver 100 is shown.

In embodiments, the path selector 108 may determine that a particular set of baseband modulated I/Q streams 126e-126h (e.g., associated with resamplers 118e-118h) may each be associated with a substantially similarly high signal quality, e.g., based on prior or historical FOM evaluation. For example, the parallel sampling paths 106 associated with each baseband modulated I/Q stream 126e-126h of the demodulated digital signals 124e-124h may be evaluated (118e-118h) as showing a similar absence of significant difference in FOM. In embodiments, the path selector 108 may coherently combine (e.g., via coherent combiner 200) one or more baseband modulated I/Q streams 126e-126h prior to demodulation 202 into a combined demodulated signal 204. For example, the combined demodulated signal 204 may likewise be stored to memory (206), time-aligned with the demodulated digital output stream 130, and evaluated according to the current FOM (208). In embodiments, if the combined demodulated signal 204 is associated with significant improvement in signal quality and/or receiver sensitivity, e.g., significantly improving the signal to noise ratio (SNR) of the demodulated digital output stream 130 signal over any corresponding individual demodulated signal 128e-128h for the same time window. For example, every octave increase in parallel sampling paths 106 may be associated with a 3 dB increase in SNR.

Figure 3:
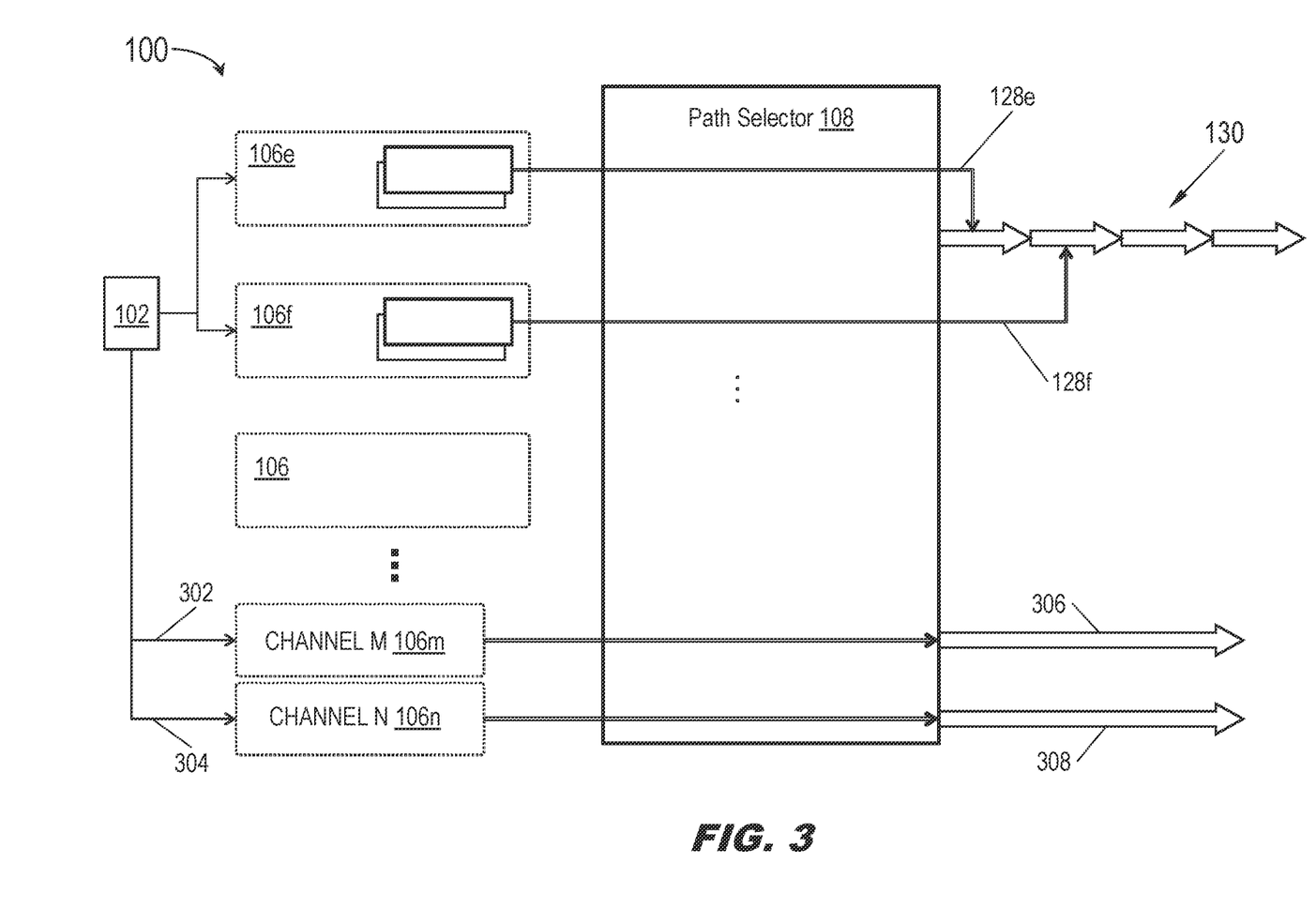
FIG. 3 is a block diagram illustrating multi-channel receiving operations of the receiver of FIG. 1.

Referring now to FIG. 3, the signal receiver 100 is shown.

In embodiments, the signal receiver 100 may dedicate selected parallel sampling paths 106 to multi-channel reception. For example, the system stimulus 102 may include multiple tunable channels and the signal receiver 100 may achieve sufficient dynamic range and/or receiver sensitivity via fewer than the N available parallel sampling paths 106 (e.g., the parallel sampling paths 106e, 106f contributing demodulated signals (128e, 128f) to the demodulated digital output stream 126).

In embodiments, the signal receiver 100 may dedicate additional parallel sampling paths 106m, 106n as independent tunable channels for reception, sampling, filtering, processing, and/or demodulation of additional input signals 302, 304 via the signal receiver, e.g., such that the output of the signal receiver 100 includes, in addition to the demodulated digital output stream 126, independent demodulated digital output signals 306, 308 based respectively on the additional input signals 302, 304.

Embodiments of the inventive concepts disclosed herein may provide reception and sampling of input signals, across a broad variety of waveforms and modulations and through a variety of receiver types (e.g., radar, RF communications, data links), without spurious products created internally by the sampling system. Both military and commercial end users may more fully utilize direct-sampling receiver architecture where prior receiver architectures were limited in performance by spurious susceptibility.

Figure 4A:
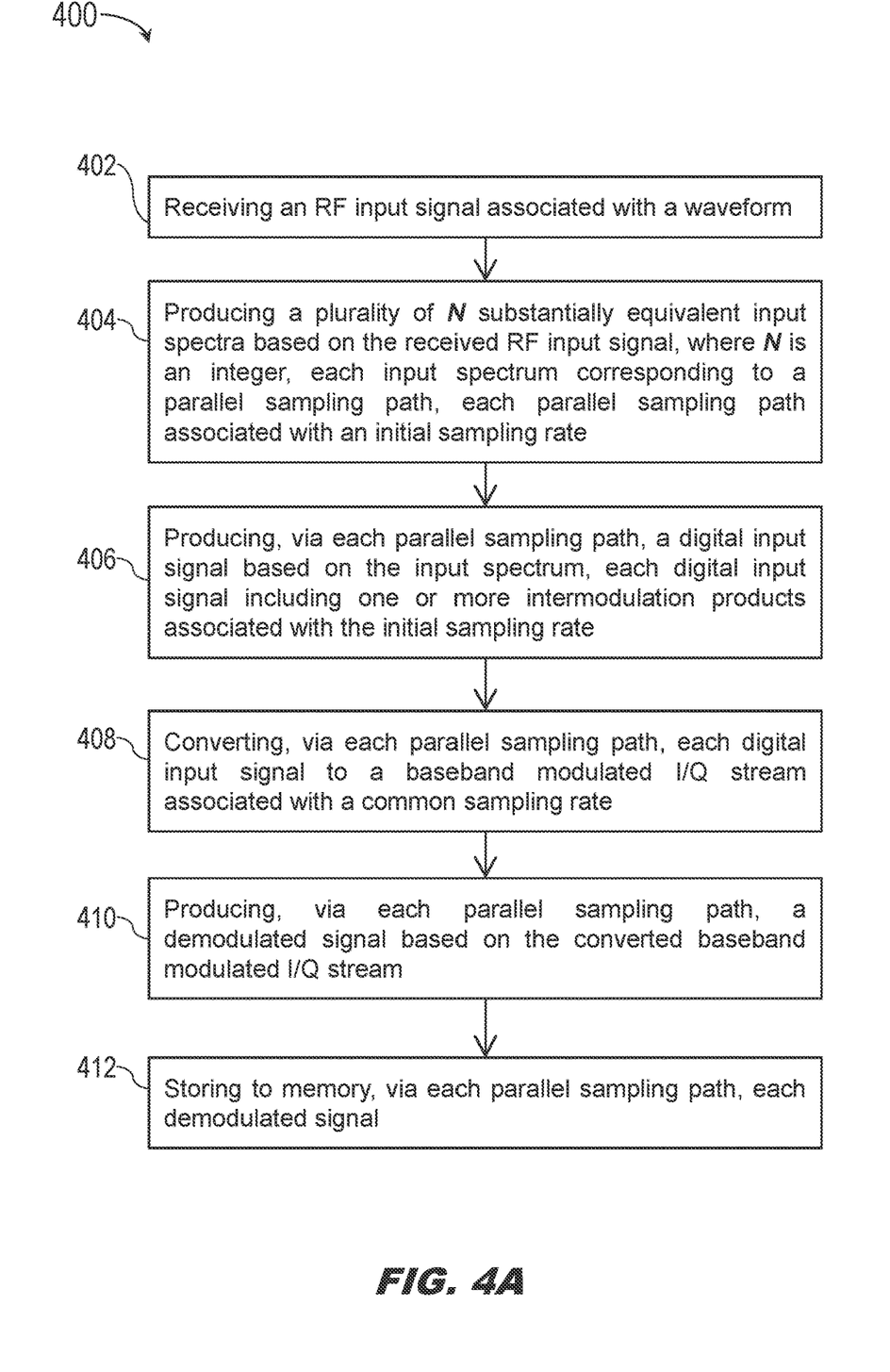
FIGS. 4A through 4D are flow diagrams illustrating a method for selectable sampling of a received RF signal according to example embodiments of this disclosure.

Referring now to FIG. 4A, the method 400 may be implemented by embodiments of the signal receiver 100 and may include the following steps.

At a step 402, the signal receiver receives a system stimulus associated with at least one particular waveform. For example, the system stimulus may be an analog RF signal received via antenna elements.

At a step 404, the signal splitter/duplicator splits the system stimulus into a set of N equivalent input spectra, each input spectrum directed to a parallel sampling path and each parallel sampling path having a sampling clock set to an initial sampling rate. For example, each parallel sampling path may be set to an initial sampling rate distinct from all other sampling paths.

At a step 406, the samplers of each parallel sampling path produce a digital input signal by sampling the input spectrum at the appropriate initial sampling rate. For example, each digital input signal may include specific intermodulation products based on the intermodulation of the sampling clock and the input spectrum. In some embodiments, the digital input signal may undergo further digital signal processing (e.g., filtering, mixing, decimation) subsequent to initial sampling.

At a step 408, the resamplers of each parallel sampling path convert each digital input signal (e.g., having a distinct initial sampling rate) to a baseband modulated I/Q stream having a common sampling rate shared across all parallel sampling paths. For example, the common sampling rate may determine the length of a time window corresponding to the converted digital input signal and the frequency with which segments of the digital output stream are evaluated and selected.

At a step 410, the demodulators of each parallel sampling path demodulate their baseband modulated I/Q stream into a demodulated signal. For example, if the baseband modulated I/Q stream includes on-channel intermodulation products that interfere with its demodulation, that interference may be reflected in the quality of (e.g., distortion of) the demodulated signal.

At a step 412, the figure of merit (FOM) evaluation block of each parallel sampling path stores the respective demodulated signal to dedicated memory.

Figure 4B:
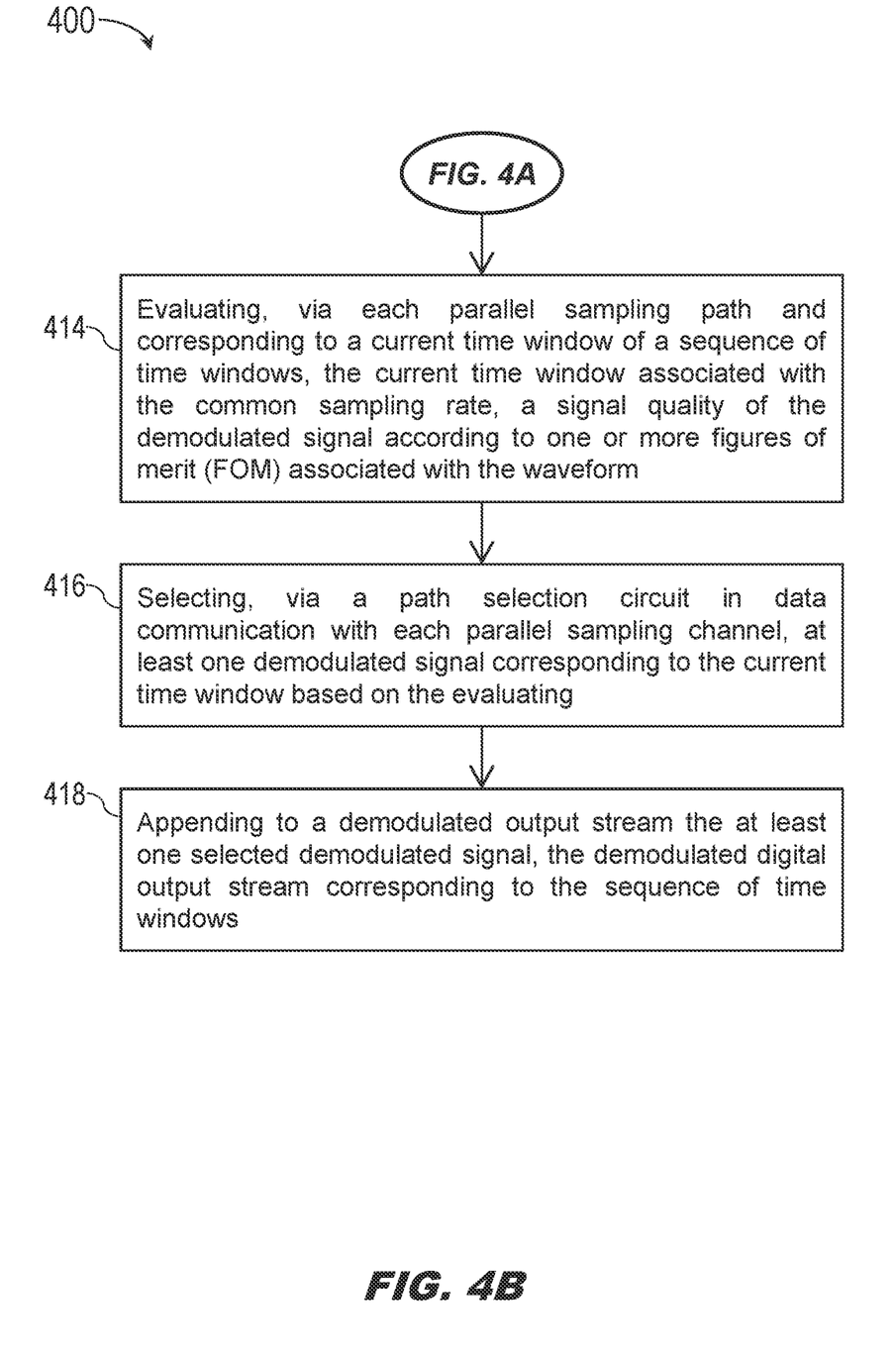

Referring also to FIG. 4B, at a step 414, the FOM evaluation block of each parallel sampling path evaluates its respective demodulated signal for signal quality (e.g., distortion or lack thereof) based on a set of FOM metrics determined by the waveform of the system stimulus. For example, each evaluation may correspond to a current time window, or a current portion of a sequence of time windows corresponding to the receiver output stream (e.g., a continuous output signal comprising a sequence of selected and appended demodulated digital signals, where the highest quality signal is chosen for each successive time window at a frequency based on the common sampling rate).

At a step 416, the path selector chooses (e.g., for the current time window) the demodulated signal associated with the highest signal quality and/or sensitivity (e.g., lack of distortion and/or on-channel intermodulation products associated with FOM degradation).

At a step 418, the path selector retrieves from dedicated memory, and appends to the demodulated digital output stream of the signal receiver, the selected demodulated signal. For example, the retrieved demodulated signal may be time-aligned to the demodulated digital output stream, e.g., the corresponding time markers in the retrieved demodulated signal aligned with the corresponding time markers in the demodulated digital output stream, and the time-aligned demodulated signal appended to the demodulated digital output stream.

Figure 4C:
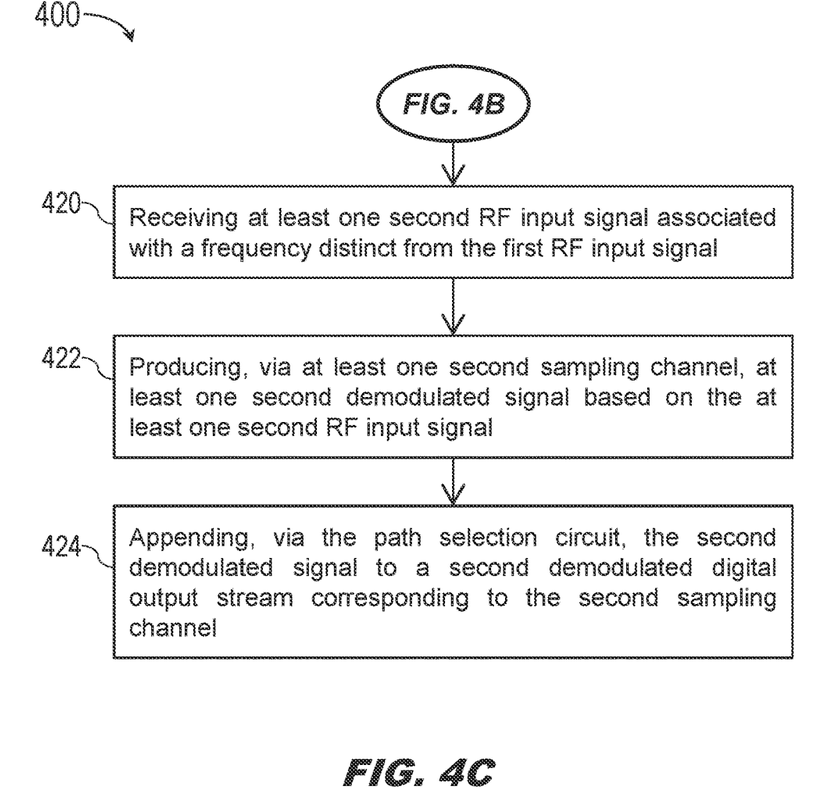

Referring also to FIG. 4C, in some embodiments, the method 400 includes method steps 420 through 424.

At the step 420, the system stimulus includes multiple tunable channels, e.g., additional distinct RF inputs or additional distinct RF input spectra (or, e.g., inputs within other electromagnetic spectra) at frequencies distinct from each other.

At a step 422, additional parallel sampling paths (e.g., those sampling paths not dedicated to parallel sampling of the primary RF input spectrum) sample and demodulate the additional RF inputs or RF input spectra into additional demodulated signals.

At the step 424, the path selector maintains unique and independent demodulated data streams for appending each additional demodulated independent digital signal to a corresponding demodulated digital output stream for that independent tunable channel.

Figure 4D:
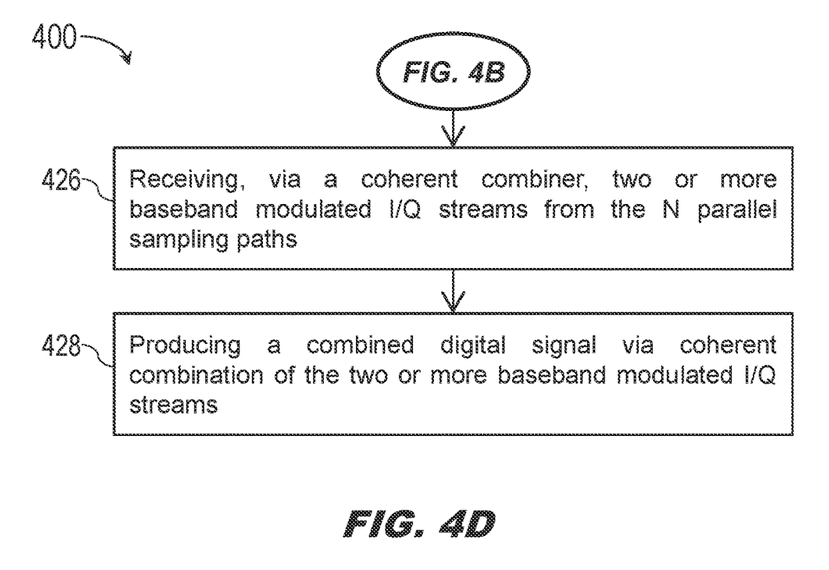

Referring also to FIG. 4D, the method 400 may include additional steps 426 and 428. At the step 426, a coherent combiner receives two or more baseband modulated I/Q streams (e.g., if the associated parallel sampling paths are previously or historically associated with high signal quality, low distortion, high receiver sensitivity, etc.).

At the step 428, the coherent combiner produces a combined digital signal via coherent combination of the baseband modulated I/Q streams. The resulting combined digital signal may be demodulated, stored to memory, evaluated, selected, and/or appended to the demodulated digital output stream alongside the other parallel sampling paths.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A receiver sampling system, comprising:
radio frequency (RF) circuitry configured for:
receiving an RF input signal associated with a waveform;
and
producing, via manipulation of the RF input signal, a plurality of N substantially equivalent input spectra, where N is an integer;
a set of N parallel sampling paths communicatively coupled to the RF circuitry, each sampling channel corresponding to an input spectrum and comprising:
a sampling clock associated with a predetermined sampling rate, wherein each sampling channel corresponds to an initial sampling rate;
at least one analog-digital converter (ADC) configured to provide a digital input signal based on the input spectrum, the digital input signal including one or more intermodulation products associated with the initial sampling rate;
at least one resampler configured to convert the digital input signal to a baseband modulated I/Q stream associated with a common sampling rate common to the set of N parallel sampling paths;
at least one demodulator in data communication with the one or more ADCs, the at least one demodulator configured to produce, based on the baseband modulated I/Q stream, a demodulated digital signal;
an evaluation block in data communication with the at least one demodulator and comprising:
a memory configured for storage of the demodulated digital signal;
and
evaluation circuitry configured for evaluation of at least one aspect of the demodulated digital signal according to one or more figures of merit (FOM) associated with the waveform, the at least one aspect associated with the one or more intermodulation products and the evaluation corresponding to a time window of a sequence of time windows, the time window associated with the common sampling rate;
and
a path selection circuit in data communication with the N parallel sampling paths via each evaluation block, the path selection circuit configured to:
select at least one demodulated digital signal based on the N evaluations corresponding to the time window;
and
append the selected demodulated digital signal to a demodulated output stream corresponding to the sequence of time windows.

2. The receiver sampling system of claim 1, wherein the at least one aspect includes one or more of a signal quality, a signal distortion, or a receiver sensitivity.

3. The receiver sampling system of claim 1, wherein the path selection circuit is configured to select the demodulated digital signal associated with a highest signal quality according to the one or more FOM.

4. The receiver sampling system of claim 1, wherein the path selection circuit is configured to append the selected demodulated signal to the demodulated digital output stream by:
retrieving from the memory the stored demodulated signal corresponding to the selected demodulated signal;
and
appending the retrieved demodulated signal to the demodulated digital output stream.

5. The receiver sampling system of claim 4, wherein the memory is configured for time-alignment of the stored demodulated signal to the demodulated digital output stream.

6. The receiver sampling system of claim 1, wherein the at least one demodulator is a first demodulator, the memory is a first memory, and the evaluation block is a first evaluation block, further comprising:
at least one coherent combiner configured to:
receive two or more baseband modulated I/Q streams;
and
provide a combined digital signal by coherently combining the two or more baseband modulated I/Q streams;
at least one second demodulator configured to produce a combined demodulated signal based on the combined digital signal;
at least one second memory configured for storage of the combined demodulated signal;
and
at least one second evaluation block configured for
when two or more demodulated digital signals are associated with a substantially equivalent signal quality, the evaluation circuitry is configured to:
produce a combination digital signal via coherent combination of the two or more demodulated digital signals;
and
append/provide the combination digital signal to the demodulated digital output stream.

7. The receiver sampling system of claim 1, wherein the RF input signal is a first RF input signal and the N parallel sampling paths are first sampling paths, further comprising:
one or more second sampling paths, each second sampling channel configured to:
receive at least one second RF input signal associated with a distinct frequency;

provide at least one second digital output signal corresponding to the second RF input signal;
and
produce at least one second demodulated digital signal based on the second digital input signal;
and wherein
the path selection circuit is communicatively coupled to each second sampling channel and configured to append each second demodulated digital signal to a second demodulated digital output stream corresponding to the second sampling channel.

8. A method for selectable sampling of a received RF signal, the method comprising:
receiving an RF input signal associated with a waveform;
producing a plurality of N substantially equivalent input spectra based on the received RF input signal, where N is an integer, the N input spectra corresponding to N parallel sampling paths, each parallel sampling path associated with an initial sampling rate;
producing, via each parallel sampling path, a digital input signal based on the input spectrum, each digital input signal including one or more intermodulation products associated with the initial sampling rate;
converting, via each parallel sampling path, each digital input signal to a baseband modulated I/Q stream associated with a common sampling rate;
producing, via each parallel sampling path, a demodulated signal based on the baseband modulated I/Q stream;
storing to memory, via each parallel sampling path, each demodulated signal;
evaluating, via each parallel sampling path and corresponding to a current time window of a sequence of time windows, the current time window associated with the common sampling rate, at least one aspect of the demodulated signal according to one or more figures of merit (FOM) associated with the waveform;
selecting, via a path selection circuit in data communication with each parallel sampling path, at least one demodulated signal corresponding to the current time window based on the evaluating;
and
appending to a demodulated output stream the at least one selected demodulated signal, the demodulated digital output stream corresponding to the sequence of time windows.

9. The method of claim 8, wherein selecting, via a path selection circuit in data communication with each parallel sampling path, at least one demodulated signal corresponding to the time window based on the evaluating includes:
selecting the demodulated signal associated with the highest signal quality.

10. The method of claim 8, wherein evaluating at least one aspect of the demodulated signal according to one or more figures of merit (FOM) associated with the waveform includes:
evaluating at least one of a signal quality, a signal distortion, or a receiver sensitivity associated with the demodulated signal.

11. The method of claim 8, wherein storing to the memory, via each parallel sampling path, each demodulated signal includes:
time-aligning, via the memory, the stored demodulated signal to the demodulated digital output stream.

12. The method of claim 8, wherein:
selecting, via a path selection circuit in data communication with each parallel sampling path, at least one demodulated signal corresponding to the time window based on the evaluating includes:
retrieving from the memory the stored demodulated signal corresponding to the selected demodulated signal;
and
appending to a demodulated digital output stream the at least one selected demodulated signal includes:
appending to the demodulated digital output stream the retrieved demodulated signal.

13. The method of claim 8, further comprising:
receiving, via a coherent combiner, two or more baseband modulated I/Q streams from the N parallel sampling paths;
and
producing a combined digital signal via coherent combination of the two or more baseband modulated I/Q streams;
and wherein
producing, via each parallel sampling path, a demodulated signal based on the baseband modulated I/Q stream includes:
producing a combined demodulated signal by demodulating the combined digital signal;
storing to memory each demodulated signal includes:
storing to memory the combined demodulated signal;
evaluating at least one aspect of the demodulated signal according to one or more FOM includes:
evaluating at least one aspect of the combined demodulated signal according to the one or more FOM;
selecting, via a path selection circuit, at least one demodulated signal corresponding to the current time window includes:
selecting the combined demodulated signal;
and
appending to a demodulated digital output stream the at least one selected demodulated signal includes:
appending the combined demodulated signal to the demodulated digital output stream.

14. The method of claim 8, wherein the RF input signal is a first RF input signal, the at least one demodulated signal is a first demodulated signal, and the N parallel sampling paths are first sampling paths, further comprising:
receiving at least one second RF input signal associated with a frequency distinct from the first RF input signal;
producing, via at least one second sampling channel, at least one second demodulated digital signal based on the at least one second RF input signal;
and
appending, via the path selection circuit, the second demodulated signal to a second demodulated digital output stream corresponding to the second sampling channel.

* * * * *